United States Patent Office 3,272,705
Patented Sept. 13, 1966

3,272,705
LAXATIVE COMPOSITION AND METHOD OF USING SAME
Friedrich Petuely, Graz, Austria, assignor, by mesne assignments, to North American Philips Company, Inc., New York, N.Y., a corporation of Delaware
No Drawing. Filed June 13, 1963, Ser. No. 287,519
8 Claims. (Cl. 167—56)

The invention in this case relates to composition useful for maintaining intestinal regularity and to a method of maintaining intestinal regularity.

This application is a continuation-in-part of application Serial No. 93,283, filed February 6, 1961, now abandoned, which is a division of application Serial No. 647,177, filed March 12, 1957, now abandoned and which application Serial No. 647,177 was a continuation-in-part of application Serial No. 362,130, filed June 16, 1953 and now U.S. Patent No. 2,811,450.

A principal object of my invention is to provide a more effective and safe method for maintaining intestinal regularity in humans.

This and other objects of my invention will be apparent from the description that follows:

According to my invention I have unexpectedly found that intestinal regularity (intestinal peristalsis) may be greatly improved in humans by the oral administration of the substance, lactulose.

The administration of lactulose has been found to be a safe and effective method of enhancing intestinal peristalsis and may be administered safely to children as well as adults.

It has been found that daily dosage of from 0.05–0.37 gms. or more of lactulose per kgm. of body-weight may result in the development of an intestine regulating effect. Normally, however, doses of from 0.09–0.37 gms. per kg. of body-weight of lactulose are effective. When a syrup is used containing 0.74 gms. of lactulose per cm.$^3$ the following doses are applicable:

(a) Infants up to 1 year: 2–3 mls. once a day
(b) Children: 3–6 mls. once a day
(c) Children from 6 up to 12 years: 4–8 mls. once a day
(d) Adults: 4–45 mls. once a day.

A mixture, such as a mixture containing lactulose, lactose and galactose dissolved in water may be employed. Such a mixture containing from 60–50 gms. of lactulose, 7–3 gms. of galactose, 12–8 gms. of lactose and 25–35 gms. of water may be employed. A suitable solution comprises per 100 gms.:

| | Gms. |
|---|---|
| Lactulose | 55 |
| Galactose | 5 |
| Lactose | 10 |
| Water | 30 |

In particular the last-mentioned solution satisfies the prescription conditions as mentioned under (a) to (d).

One may also use a lactulose in the solid form. Also in this case a dose of between 0.05 and 0.37 gm. per kg. body weight of lactulose per day may be employed. A suitable solid preparation of lactulose comprises a mixture of lactulose with lactose and galactose, and if desired a small amount of rice flour. Such a preparation may consist of 20–45% of lactulose, 70–45% of lactose, 0–5% of another disaccharide, such as galactose or sucrose, 0–8% of a pre-cooked flour and 0.5–4% of water. Preferably such a product comprises 30–45% of lactulose, 2–5% of a pre-cooked rice flour, 2–5% of galactose and 60–55% of lactose, all percentages being by weight.

My invention will now be described in greater detail with reference to the following examples.

In the following Examples I–IV methods of preparing lactulose are shown.

EXAMPLE I 38 l. of water were brought to boil and 62.5 kgs. of lactose rapidly dissolved therein. To this solution a suspension of 105 gms. of calcium oxide in 0.5 l. water was added and the mixture warmed for 15 minutes at 100° to 102° C. Subsequently, the reaction mixture was cooled to 60° C. and the non-reacted calcium hydroxide removed. After two days the crystallized lactose was sucked off.

The filtrate was concentrated to half its volume by evaporation, and cooled. The lactose crystals formed were filtered off and the syrup diluted with water to a concentration of 25 gms. per 100 mls. To 4.5 l. of this syrup 80 gms. of sodium bromide were added and through this solution a current of approximately 8 amps. was passed via two graphite electrodes of 20 x 20 x 1 cms. for 17 to 40 hours until aldoses were no longer detectable chromatographically (140 to 160 amp. hours, current density 0.03 A./cm.$^2$).

During oxidation, $CaCO_3$ in excess was added in order to neutralize the acids formed, beginning about half an hour after switching on the current. After oxidation, the mixture was filtered and the solution successively passed over cation- and anion ion-exchangers.

The solution obtained (weight after drying approximately 600 gms.) was concentrated in vacuo and most of the water was removed by adding methanol and absolute methanol and distilling it off again. The lactulose ultimately crystallized from a methanolic solution containing 2.4% of water and 30% of lactulose. Melting point 161° to 163° C. Specific rotation after mutarotation −47°.

EXAMPLE II 62.5 kgs. of lactose were dissolved in 38 l. of boiling water. To this solution 125 gms. of calcium oxide in 1 liter of water were added. After maintaining the solution for 20 minutes at 95° C., an additional 125 gms. of calcium oxide suspended in 1 liter water were added and the whole was maintained at 95° C. for 10 minutes.

The solution was rapidly cooled while stirring. After two hours, the lactose was centrifuged off. Yield 33 kgs. The remaining syrup was successively passed over the ion exchangers referred to in Example I.

The solution obtained was concentrated by evaporation to approximately 50 gms. per 100 ml. 2.4 l. of this solution were concentrated by evaporation in vacuo to a volume of 1.5 l. and 4 l. of methanol were added to the concentrate, 480 gms. of lactulose crystallizing out after some time while stirring.

The filtrate was concentrated by evaporation in vacuo and freed from methanol, thus obtaining 1700 ml. of syrup containing 460 gms. of lactulose, 102 gms. of lactose and 113.5 gms. of galactose (determined paper-chromatographically). One half of this solution was diluted with water to a solid substance content of 20% and stirred for one and a half hours with 40 mls. of bromine and 250 gms. of $CaCO_3$. The bromine in excess was removed with the aid of sodium thiosulphate. After additing decoloration carbon, the solution was filtered and purified by treating it with the ion exchangers referred to in Example I. The filtrate and the washing liquid were treated with decoloration carbon, filtered and concentrated by evaporation in vacuo. The syrup was treated with methanol while stirring, thus obtaining a deposit of sugar lactones, which was filtered off.

The treatment was repeated until the addition of methanol no longer rendered the substance turbid.

The solution was concentrated by evaporation and all the water was removed by adding and distilling off in vacuo methanol and absolute methanol. The residue was dissolved in 600 mls. of absolute methanol. Crystallization yielded 123 gms. of lactulose. Melting point 169° C. Rotation after mutarotation $(\alpha)_D^{20} = -49$.

EXAMPLE III 56 l. of water were heated to 100° C. and 92 kgs. of lactose rapidly dissolved in it. A suspension of 156 gms. of calcium oxide in 1 liter of water was added to the solution and the mixture heated for 15 minutes at 100° C. to 102° C. After standing overnight, the lactose crystals were drawn off. 10 liters (11.6 gms.) of the filtrate were concentrated by evaporation in vacuo to 5 l. By adding methanol and distilling it off in vacuo, still more water was removed from the syrup. Finally, the volume was increased with methanol to 30 l., 970 gms. of lactose crystallizing within 24 hours. The filtrate was further freed from water by adding methanol and absolute methanol and distilling it off in vacuo. The residue was dissolved in 10 l. of absolute methanol. After one week, an additional 400 gms. of lactose crystallized. The methanol was distilled off and the residue dissolved in 6 l. absolute pyridine, 2 l. of pyridine being distilled off in vacuo, thus completely removing any residue of methanol and water. The volume was increased with absolute pyridine to 20 l. and the solution cooled to 16° C. Subsequently, 14 l. of acetic acid anhydride were slowly added to the solution while stirring. The temperature was maintained below 25° C. After standing 22 hours at 20° C., the reaction mixture was decanted into 150 l. of water. The suspension obtained was subsequently extracted with 15, 15 and 10 l. of chloroform, thereafter the extract was washed with 2 $H_2SO_4$, 5% $NaHCO_3$ and water to a neutral reaction. The chloroform was distilled off in vacuo. Any chloroform residue was completely removed on the steam bath after adding ethanol. The residue was dissolved in 16 l. of ethanol and warmed with decoloration carbon. The solution was filtered, inoculated with lactulose-octaacetate and crystallized while stirring.

The solution was allowed to stand for two days at approximately 5° C., the crystals subsequently being filtered off and washed with ethanol. The product was stirred with 5 l. of alcohol and filtered off again. Yield 659 gms., melting point 137° C. to 138° C. Melting point after recrystallizing once, 138° C. to 139° C.

200 gms. of lactulose-octa-acetate (melting point 138° C. to 139° C.) together with 31 liters of 0.1 $n$HCl were carefully stirred at 71° C. to 71.5° C. After 24 hours, all of the lactulose-octa-acetate was dissolved. The solution was cooled and extracted with chloroform, the extract containing 130 gms. of substance.

The water layer was evaporated free from chloroform in vacuo and stirred with an ion exchanger for 15 minutes. The exchanger was alternately treated several times with 5% $H_2SO_4$ and 2% NaOH. The pH of the lactulose solution rose from approximately unity to approximately 3.5 during stirring.

The exchanger was filtered off and thoroughly washed with water, the aqueous solution treated with decoloration carbon, filtered and concentrated by evaporation at a low temperature in vacuo. By adding and distilling off methanol and absolute methanol in vacuo, the water was removed. Crystallization of the residue from 260 gms. of absolute methanol yielded 45 gms. of lactulose. Melting point 164° C. Rotation $(\alpha)_D^{20} = -50.4$.

EXAMPLE IV 4 kgs. of lactose were dissolved while stirring in 2.38 l. of boiling water. To this solution 12.5 gms. of calcium oxide suspended in a little water were added and the mixture was gently boiled for 10 minutes, the solution being cooled while stirring. After standing overnight, the solution was filtered, yield: 2.8 kgs. of lactose. The residual syrup was purified with the aid of the exchangers referred to in Example I.

The solution was treated with decoloration carbon and concentrated as much as possible by evaporation. The residue (dry weight 858 gms. of lactulose, content 44.5%) was stirred with a fourfold quantity of methanol. 184 gms. of lactose crystallized. The filtrate was concentrated by evaporation in vacuo to 1 liter. 4 l. of methanol were added to the concentrate. Crystallization while stirring yielded 230 gms. of substantially pure lactose. The filtrate was concentrated by evaporation in vacuo and practically all the water was removed by adding and distilling off absolute methanol in vacuo.

The residue was stirred with 2 l. of absolute methanol and after one week 44 gms. of lactose containing small quantities of lactulose and galactose were filtered off.

The mother liquor was treated with decoloration carbon, filtered and inoculated with lactulose. After one week, 30 gms. of a product of the following composition were filtered off: lactose 14.5%, lactulose 73.6% and galactose 3.68%. A small quantity of absolute ethanol was added to the mother liquor. Crystallization while stirring yielded the following products: 88 gms. of a composition lactose 11.7%, lactulose 82%, no galactose and 88 gms. of a composition of lactose 4.03%, lactulose 92.8%, no galactose.

The effect of the administration of lactulose on constipation in humans is shown in the following examples.

In these examples a syrup of the following composition was used:

| | Gms. |
|---|---|
| Lactulose | 55 |
| Galactose | 5 |
| Lactose | 10 |
| Water | 30 |

I. Slight chronic constipation

Case No. 1.—Sister Agnes, 44 years old: The patient had been suffering from chronic cholecystitis, with defecations every second or third day. The patient was treated so far with senna leaves tea. This resulted in diarrhea-like defecations with gripes and spasms in the intestine. This treatment was terminated and instead thereof the patient was then given an oral dose of 45 mls. of the above-mentioned syrup. These doses were given daily, in the morning. Thereafter defecation was normal, painless and daily. After 3 months of treatment the effect was still lasting.

II. Serious chronic constitutional constipation

Case No. 2.—Patient Mrs. Anna M., 56 years old: The patient got serious typhus and myocarditis when she was 19 years of age. Since then she suffered from endocrinous obesity. Since her 41st year the patient suffered from chronic cholecystopathy and serious chronic constipation with defecation taking place every third to fifth day. The patient had been treated so far with 1,8-dihydroxy-anthraquinone or 2 - indolinone - 3,3 - bis(para-hydroxyphenyl), decoction of herbs and so on. The patient was given an oral dose of 45 mls. of the above-mentioned syrup. The syrup was given in the morning on an empty stomach. One to two hours after intake the patient had regularly, firm stools, while the defecation was painless. This treatment was continued for two weeks, but from then on the syrup was only taken every second or third day in the same dosage. In spite of this, defecation took place daily.

III. Constipation due to the patients' being bedridden, especially in most serious cases with e.g. cardiac infarct, carcinoma and so on Case No. 3.—Patient Anna S., 40 years old: The patient had a uterus-carcinoma and a Wertheim's operation in 1940. In 1951 the patient suffered from ileus, whereas in 1954 a carcinoma-recidivation was found in the small pelvis. Strangulation of the right ureter and the colon was diagnosed. The patient was bedridden and suffered from constipation with defecations at intervals of two to five days. Laxatives did not show a desired result. After daily administrations however of 40 to 60 mls. of the above-mentioned syrup defecations took place daily or every other day.

The weights of the patients were continuously controlled for a few months, in order to notice possible disturbances in the utilisation of the food. There actually was not a single case of decreased weight, as is often seen under the influence of laxatives in cases of stubborn constipation.

While I have described my invention in connection with specific embodiments and applications, other modifications thereof will be readily apparent to those skilled in this art without departing from the spirit and scope of the invention as defined in the appended claims.

What I claim is:

1. A method of improving intestinal peristalsis in constipated humans comprising daily orally administrating to said humans at least 0.05 gms. of lactulose per kg. of body-weight and in an amount effective to treat said constipation.

2. A method of treating constipation in constipated humans comprising daily orally administrating to said humans from about 0.09 to 0.37 gms. of lactulose per kg. of body-weight.

3. A method of claim 2, wherein a mixture of lactulose, lactose and galactose is employed.

4. The method of claim 2, wherein a mixture of 20–45% of lactulose, 70–45% of lactose, 0–5% of another disaccharide selected from the group consisting of galactose and sucrose, 0–8% of a pre-cooked flour and 0.5–4% by weight of water is employed.

5. The method of claim 2, wherein a mixture of 30–45% of lactulose, 2–5% of pre-cooked rice flour, 2–5% of galactose and 60–55% by weight of lactose is employed.

6. The method of claim 3, wherein an aqueous solution is employed.

7. The method of claim 6, wherein an aqueous solution is used comprising per 100 gms. 60–50 gms. of lactulose, 7–3 gms. of galactose, 12–8 gms. of lactose and 25–35 gms. of water.

8. A liquid composition for treating constipation in human beings, said composition comprising, per 100 grams, from 50 to 60 grams inclusive of lactulose, from 3 to 7 grams inclusive of galactose, from 8 to 12 grams inclusive of lactose and from 25 to 35 grams inclusive of water.

References Cited by the Examiner

UNITED STATES PATENTS 2,811,450  10/1957  Petuely _____ 99—54

JULIAN S. LEVITT, *Primary Examiner.*

FRANK CACCIAPAGLIA, JR., *Examiner.*

SAM ROSEN, *Assistant Examiner.*